(12) United States Patent
Takaku et al.

(10) Patent No.: US 7,117,664 B2
(45) Date of Patent: Oct. 10, 2006

(54) DIAGNOSTIC EQUIPMENT FOR AN EXHAUST GAS CLEANING APPARATUS

(75) Inventors: Yutaka Takaku, Katsuta (JP); Toshio Ishii, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/922,868

(22) Filed: Aug. 23, 2004

(65) Prior Publication Data

US 2005/0016160 A1    Jan. 27, 2005

Related U.S. Application Data

(60) Continuation of application No. 10/141,816, filed on May 10, 2002, now Pat. No. 6,807,806, which is a continuation of application No. 09/983,476, filed on Oct. 24, 2001, now Pat. No. 6,408,617, which is a continuation of application No. 09/598,054, filed on Jun. 21, 2000, now Pat. No. 6,330,795, which is a continuation of application No. 09/282,148, filed on Mar. 31, 1999, now Pat. No. 6,089,016, which is a division of application No. 08/795,142, filed on Feb. 7, 1997, now Pat. No. 5,921,078, which is a continuation of application No. 08/224,881, filed on Apr. 8, 1994, now Pat. No. 5,743,085.

(30) Foreign Application Priority Data

Apr. 9, 1993    (JP)    .................................... 5-83326

(51) Int. Cl.
*F01N 3/00*    (2006.01)

(52) U.S. Cl. ........................... 60/277; 60/276; 60/285; 123/688

(58) Field of Classification Search .................. 60/274, 60/276, 277, 285, 289, 293; 123/479, 688, 123/690, 691

See application file for complete search history.

(56) References Cited

U.S. PATENT DOCUMENTS 5,119,631 A * 6/1992 Kayanuma .................... 60/289
5,134,847 A * 8/1992 Ogawa ......................... 60/277

(Continued)

FOREIGN PATENT DOCUMENTS

DE    38 37 984 A1    5/1989

(Continued)

OTHER PUBLICATIONS

Copy of Japanese Office Action with English translation dated Jul. 3, 2001.

*Primary Examiner*—Binh Q. Tran
(74) *Attorney, Agent, or Firm*—Crowell & Moring LLP

(57) ABSTRACT

A diagnostic equipment for an exhaust gas cleaning apparatus installed for an engine, comprising a misfire detector which detects the misfire of the engine, and a secondary-air-system failure detector which detects the failure of a secondary air system. An index corrector corrects a deterioration index calculated by a deterioration-index calculator, in accordance with the detected result of the detector. A deterioration decision unit decides if the diagnostic equipment has failed, by the use of the corrected deterioration index. In a case where the extent of the misfire or the like is severe, a decision interrupter interrupts the decision of the deterioration decision unit. Thus, even when the misfire of the engine or the failure of the secondary air system has occurred, the detection of the deterioration of a catalyst does not err. It is therefore avoided to erroneously replace the catalyst which has not deteriorated yet, or to run the engine in spite of the deterioration of the catalyst.

6 Claims, 11 Drawing Sheets

U.S. PATENT DOCUMENTS

| | | | |
|---|---|---|---|
| 5,158,059 A * | 10/1992 | Kuroda | 60/277 |
| 5,331,808 A | 7/1994 | Koike | 60/276 |
| 5,341,642 A * | 8/1994 | Kurihara et al. | 60/276 |
| 5,375,416 A | 12/1994 | Iwata | |
| 5,386,695 A | 2/1995 | Iwata | |
| 5,396,766 A | 3/1995 | Sato et al. | 60/276 |
| 5,437,154 A * | 8/1995 | Sato et al. | 60/276 |
| 5,509,268 A * | 4/1996 | Kuroda et al. | 60/277 |
| 5,743,085 A | 4/1998 | Takaku et al. | 60/276 |
| 5,921,078 A * | 7/1999 | Takaku et al. | 60/277 |
| 6,089,016 A * | 7/2000 | Takaku | 60/277 |
| 6,330,795 B1 * | 12/2001 | Takaku et al. | 60/277 |
| 6,463,735 B1 * | 10/2002 | Morinaga et al. | 60/277 |
| 6,745,559 B1 * | 6/2004 | Schnaibel et al. | 60/274 |

FOREIGN PATENT DOCUMENTS

| | | |
|---|---|---|
| DE | 40 09 901 A1 | 10/1991 |
| EP | 0 475 177 A2 | 3/1992 |
| EP | 0 478 133 A2 | 4/1992 |
| JP | 378941 | 8/1981 |
| JP | 63111256 | 5/1988 |
| JP | 2-91440 | 3/1990 |
| JP | 03078941 U | 8/1991 |
| JP | 3-286160 | 12/1991 |
| JP | 03286160 A | 12/1991 |
| JP | 4060133 | 2/1992 |
| JP | 04311649 A | 11/1992 |
| JP | 05086955 A | 4/1993 |
| JP | 5-171924 | 7/1993 |

* cited by examiner

DIAGNOSTIC EQUIPMENT FOR AN EXHAUST GAS CLEANING APPARATUS

BACKGROUND OF THE INVENTION

1. Field of the Invention

The present invention relates to a diagnostic equipment for an exhaust gas cleaning apparatus installed in an engine system. More particularly, it relates to a diagnostic equipment for an engine exhaust gas cleaning apparatus which employs a catalyst together with a so-called "UEGO sensor (universal exhaust gas oxygen sensor)" that serves to measure an air fuel ratio in a wide range of air-fuel-ratio values or a so-called "$O_2$-sensor" (oxygen sensor) that generates a binary output on the basis of a sudden output change near a stoichiometric ratio (hereinbelow, both the sensors shall be collectively called an "air-fuel-ratio sensor").

2. Description of the Related Art

A well-known apparatus for cleaning the exhaust gas of an engine has a catalyst and an air-fuel-ratio feedback controller. The catalyst is incorporated in an exhaust pipe part for the purpose of eliminating HC (hydrocarbons), $NO_x$ (nitrogen oxides) and CO (carbon monoxide) which are contained in the exhaust gas, The air-fuel-ratio feedback controller is a device which is disposed for the purpose of causing the catalyst to demonstrate the function thereof satisfactorily, and which executes a control so as to hold the air fuel ratio of the exhaust gas at a predetermined value, while measuring the air fuel ratio by the use of an air-fuel-ratio sensor mounted upstream of the catalyst.

In such an exhaust gas cleaning apparatus, when the air-fuel-ratio sensor for measuring the air fuel ratio has undergone deterioration in its performance, the air fuel ratio sometimes deviates from the predetermined value, resulting in increase in the amounts of the noxious gas components contained in the exhaust gas. Moreover, the air fuel ratio may fall outside a ratio range in which the catalyst can demonstrate its performance, and the elimination efficiency (conversion efficiency) of the catalyst for the noxious gases may lower. On the other hand, when the catalyst itself has undergone deterioration in its performance, the conversion efficiency thereof for the noxious gases lowers in spite of the control of the air fuel ratio into the ratio range in which the catalyst can demonstrate its performance. In this manner, the deterioration of the performance of the air-fuel-ratio sensor or the catalyst results in increasing the amounts of the noxious gases which are emitted into the atmosphere. Therefore, a diagnostic equipment for the exhaust gas cleaning apparatus has been contrived in order to diagnose the performances during the drive of a vehicle furnished with the cleaning apparatus and to give warning to the driver of the vehicle against the deteriorations. By way of example, the diagnostic equipment is so constructed and operated that air-fuel-ratio sensors are respectively disposed upstream and downstream of the catalyst, and that an air-fuel-ratio feedback control is executed on the basis of, at least, the output of the air-fuel-ratio sensor located upstream of the catalyst, while the deterioration of the catalyst is detected on the basis of the output of the air-fuel-ratio sensor located downstream of the catalyst, etc. Such prior-art techniques are disclosed in the official gazettes of Japanese Patent Applications Laid-open No. 91440/1990 and No. 286160/1991.

With the method wherein, during the air-fuel-ratio feedback control, the deterioration of the catalyst is detected on the basis of the output of the air-fuel-ratio sensor located downstream of the catalyst, naturally the detection of the deterioration of the catalyst is impossible while the air-fuel-ratio feedback control is at rest. Besides, in such a case where the catalyst has not been activated yet, the detection of the catalyst deterioration is highly liable to err. It is therefore necessary to permit and inhibit the detection of the catalyst deterioration in accordance with the operating conditions of the engine, for example, the revolution speed (revolutions per minute) and load thereof. These factors are considered also in the prior-art technique disclosed in the official gazette of Japanese Patent Application Laid-open No. 91440/1990. Further, in a case where the air-fuel-ratio sensor located upstream of the catalyst has deteriorated, the detection of the catalyst deterioration is affected depending upon the extent or content thereof. Therefore, it is sometimes necessary to inhibit a correction for a detected result and the detection of the catalyst deterioration. In the prior-art technique disclosed in the official gazette of Japanese Patent Application Laid-open No. 286160/1991, accordingly, the detection of the catalyst deterioration is inhibited when the upstream air-fuel-ratio sensor has deteriorated.

Meanwhile, when the engine has misfired in the combustion stroke thereof, oxygen in air flows into an exhaust pipe together with unburnt gas. In consequence, the air-fuel-ratio sensor located upstream of the catalyst generates a spike signal indicating the lean exhaust gas, or the air-fuel-ratio sensor located downstream of the catalyst generates a signal indicating leaner exhaust gas than the actual one. This poses the problem that the accuracy of the detection of the catalyst deterioration lowers. Also in a case where a secondary air system disposed for introducing the air into the exhaust pipe has failed, the problem of the lowering of the detection accuracy is involved for such a reason that the air-fuel-ratio feedback control does not proceed normally. These drawbacks are not considered in any of the prior-art techniques.

SUMMARY OF THE INVENTION

An object of the present invention is to provide a diagnostic equipment for an exhaust gas cleaning apparatus, in which the accuracy of the detection of the deterioration of an air-fuel-ratio sensor as well as a catalyst is prevented from lowering even when the misfire of an engine and the failure of a secondary air system have taken place.

According to the present invention, when the misfire of an engine has been detected, a correction is made for a deterioration index which expresses the extent of the deterioration of a catalyst or an air-fuel-ratio sensor and which is calculated in the detection of the catalyst or sensor deterioration, or the decision of the deterioration state of the catalyst or air-fuel-ratio sensor is interrupted during the detection of the misfire. Besides, in case of the failure of a secondary air system, the correction or interruption stated above is similarly done.

Incidentally, the correction may well be made only in a case where frequence in the misfire is comparatively low or where the failure of the secondary air system is comparatively light. The decision of the deterioration state of the catalyst or air-fuel-ratio sensor may well be interrupted in a case where the frequence in the misfire is high or where the failure of the secondary air system is heavy. On this occasion, the deterioration state of the catalyst or air-fuel-ratio sensor cannot be decided. In general, however, the misfire of the engine and the failure of the secondary air system do not often occur, and such a construction is satisfactory in many uses. With this contrivance, even when the misfire of the engine or the failure of the secondary air system has occurred, the detection of the deterioration of the catalyst or air-fuel-ratio sensor is possible to some extent without lowering the accuracy thereof.

The construction of the present invention will be described more concretely below.

In the first aspect of performance of the present invention, there is provided a diagnostic equipment for an exhaust gas cleaning apparatus; the exhaust gas cleaning apparatus being directed toward an engine system furnished with an air-fuel-ratio controller which detects an air fuel ratio of exhaust gas emitted from an engine and which adjusts a quantity of fuel injection so as to hold the air fuel ratio of the exhaust gas at a predetermined value, and cleaning the exhaust gas by means of a catalyst; the diagnostic equipment comprising a first air-fuel-ratio sensor which detects the air fuel ratio of the exhaust gas upstream of the catalyst; a second air-fuel-ratio sensor which detects the air fuel ratio of the exhaust gas downstream of the catalyst; catalyst-deterioration-index calculation means for calculating a catalyst deterioration index indicative of a deterioration state of the catalyst from output signals of the first air-fuel-ratio sensor and the second air-fuel-ratio sensor; catalyst-deterioration decision means endowed with a predetermined threshold value, for deciding the deterioration state of the catalyst through a comparison between the threshold value and the catalyst deterioration index; abnormality detection means for detecting any abnormality of the engine system as affects the catalyst deterioration index; and at least one member selected from the group consisting of catalyst-deterioration-index correction means for correcting the catalyst deterioration index when the abnormality has been detected by the abnormality detection means, and catalyst-deterioration-decision interruption means for interrupting the decision of the catalyst-deterioration decision means when the abnormality has been detected by the abnormality detection means.

Herein, the abnormality detection means may well comprise misfire detection means for detecting a combustion state of the engine so as to detect occurrence of misfire of the engine.

The operation of the first aspect of performance of the present invention will be described.

The catalyst-deterioration-index calculation means calculates a catalyst deterioration index indicative of a deterioration state of the catalyst from output signals of the first air-fuel-ratio sensor and the second air-fuel-ratio sensor. The catalyst-deterioration decision means decides the deterioration state of the catalyst through a comparison between the threshold value and the catalyst deterioration index. The catalyst-deterioration-index correction means corrects the catalyst deterioration index when the abnormality has been detected by the abnormality detection means, and the catalyst-deterioration-decision interruption means interrupts the decision of the catalyst-deterioration decision means when the abnormality has been detected by the abnormality detection means.

It is also allowed that the engine system includes a secondary air system which introduces air into a part of an exhaust pipe located between the engine and the catalyst, and that the abnormality detection means comprises secondary-air-system failure detection means for detecting a failure of the secondary air system.

In the second aspect of performance of the present invention, there is provided a diagnostic equipment for an exhaust gas cleaning apparatus; the exhaust gas cleaning apparatus being directed toward an engine system furnished with an air-fuel-ratio controller which detects an air fuel ratio of exhaust gas emitted from an engine and which adjusts a quantity of fuel injection so as to hold the air fuel ratio of the exhaust gas at a predetermined value, and cleaning the exhaust gas by means of a catalyst; the diagnostic equipment comprising an air-fuel-ratio sensor which detects the air fuel ratio of the exhaust gas; sensor-deterioration-index calculation means for calculating an air-fuel-ratio-sensor-deterioration index indicative of a deterioration state of the air-fuel-ratio sensor from an output signal of the air-fuel-ratio sensor; sensor-deterioration decision means endowed with a predetermined threshold value, for deciding the deterioration state of the air-fuel-ratio sensor through a comparison between the threshold value and the air-fuel-ratio-sensor-deterioration index; abnormality detection means for detecting any abnormality of the engine system as affects the air-fuel-ratio-sensor-deterioration index; and at least one member selected from the group consisting of sensor-deterioration-index correction means for correcting the air-fuel-ratio-sensor-deterioration index when the abnormality has been detected by the abnormality detection means, and sensor-deterioration-decision interruption means for interrupting the decision of the sensor-deterioration decision means when the abnormality has been detected by the abnormality detection means.

Herein, the abnormality detection means may well comprise misfire detection means for detecting a combustion state of the engine so as to detect occurrence of misfire of the engine.

It is also allowed that the engine system includes a secondary air system which introduces air into a part of an exhaust pipe located between the engine and the catalyst, and that the abnormality detection means comprises secondary-air-system failure detection means for detecting a failure of the secondary air system.

The operation of the second aspect of performance of the present invention will be described.

The sensor-deterioration-index calculation means calculates an air-fuel-ratio-sensor-deterioration index indicative of a deterioration state of the air-fuel-ratio sensor from an output signal of the air-fuel-ratio sensor. The sensor-deterioration decision means decides the deterioration state of the air-fuel-ratio sensor through a comparison between the threshold value and the air-fuel-ratio-sensor-deterioration index. The sensor-deterioration-index correction means corrects the air-fuel-ratio-sensor-deterioration index when the abnormality has been detected by the abnormality detection means. The sensor-deterioration-decision interruption means interrupts the decision of the sensor-deterioration decision means when the abnormality has been detected by the abnormality detection means.

As stated above, according to the corresponding one of the aspects of performance of the present invention, the degree of deterioration of the catalyst or the air-fuel-ratio sensor is not erroneously decided even when the misfire of the engine and the failure or deterioration of the secondary air system has occurred. It is therefore avoided to replace the catalyst or the air-fuel-ratio sensor in spite of no deterioration thereof, or to run the engine in spite of the deterioration of the catalyst or the air-fuel-ratio sensor without the replacement thereof. Accordingly, the present invention serves to eliminate wasteful expenses and to prevent air pollution.

BRIEF DESCRIPTION OF THE DRAWINGS

FIG. 4A is a graph showing the situation of the output signal of the upstream air-fuel-ratio sensor in the case where no misfire arises, while FIG. 4B is a graph showing the situation of the output signal of the upstream air-fuel-ratio sensor in the case where misfire arises;

DESCRIPTION OF THE PREFERRED EMBODIMENTS

Now, embodiments of the present invention will be described in conjunction with the accompanying drawings.

Figure 1:
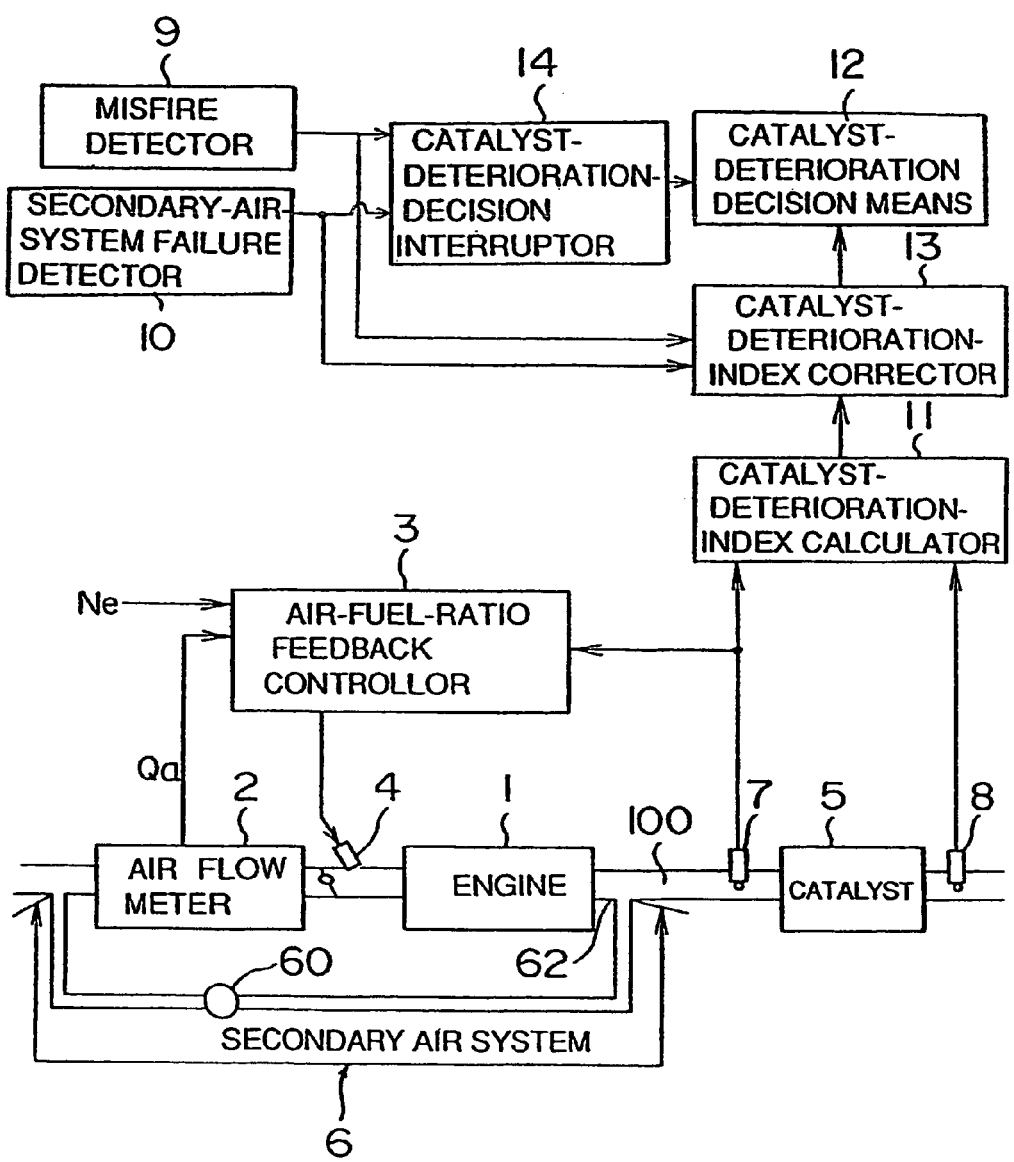
FIG. 1 is a block diagram showing the construction of one embodiment of the present invention.

FIG. 1 is a block diagram showing the construction of a diagnostic equipment which is one embodiment of the present invention, together with that of an engine system to which the diagnostic equipment is applied.

First, the illustrated example of the engine system on which the present invention is premised will be outlined. However, an object to which the diagnostic equipment of the present invention is to be applied shall not be restricted to the illustrated example.

The quantity Qa of air to be introduced into an engine 1 by suction is measured by an air flow meter 2. In addition, the revolution speed or number (revolutions per minute abbreviated to "r. p. m.") Ne of the engine 1 is measured by r. p. m. measurement means not shown. Air-fuel-ratio feedback control means 3 evaluates the basic injection quantity $F_o$ of fuel from the suction air quantity Qa and the r. p. m. Ne in accordance with Equation (1) given below:

$$F_o = k \, Qa/Ne \quad (1)$$

k: coefficient

An air-fuel-ratio sensor 7 measures the air fuel ratio of exhaust gas emitted from the engine 1. As stated before, the expression "air-fuel-ratio sensor" in this specification shall cover both the "$O_2$-sensor" which detects the oxygen concentration in terms of a binary value (and the output of which changes suddenly near the stoichiometric ratio), and the so-called "UEGO sensor" which detects the oxygen concentration linearly. The air-fuel-ratio feedback control means 3 obtains a correction coefficient α in dependency on the output of the air-fuel-ratio sensor 7, and evaluates the injection quantity F by correcting the basic injection quantity $F_o$ in accordance with Equation (2) given below:

$$F = F_o(1+\alpha) \quad (2)$$

Further, the air-fuel-ratio feedback control means 3 applies to an injector 4 a pulse signal whose width corresponds to the injection quantity F. Thus, it subjects the quantity of fuel feed to a feedback control. Owing to such control operations, the air fuel ratio of mixture is held at or near the stoichiometric ratio. A catalyst 5 for decreasing noxious components contained in the exhaust gas, oxidizes unburnt gas components (hydrocarbons abbreviated to "HC") and carbon monoxide (CO) and simultaneously deoxidizes nitrogen oxides ($NO_x$). Such a catalyst is called a "ternary catalyst". The air fuel ratio needs to be held at or near the stoichiometric ratio in order that the oxidizing and deoxidizing reactions based on the ternary catalyst may be effected at the same time. In turn, the air-fuel-ratio feedback control needs to be precisely executed for keeping the stoichiometric ratio.

A secondary air system 6 introduces air into an exhaust pipe 100 by means of a pump 60 in the operating condition of the engine 1 (for example, at the start of the engine 1) as requires the establishment of a state in which the mixture contains the fuel in excess of the stoichiometric ratio (that is, the mixture is "rich"). Thus, the secondary air system 6 functions to burn and decrease the surplus HC emitted into the exhaust pipe 100. Although not clearly seen from the drawing, the pump 60 is constructed so as to be operable in association with the air-fuel-ratio feedback control means 3, etc.

Next, the diagnostic equipment of this embodiment will be described.

As illustrated in FIG. 1, the diagnostic equipment of this embodiment is constructed comprising misfire detection means 9, secondary-air-system failure detection means 10, catalyst-deterioration-index calculation means 11, catalyst-deterioration decision means 12, catalyst-deterioration-index correction means 13 and catalyst-deterioration-decision interruption means 14.

The catalyst-deterioration-index calculation means 11 serves to detect the deterioration state of the catalyst 5. The catalyst-deterioration-index calculation means 11 in this embodiment detects the deterioration of the catalyst 5 by utilizing the correlation between the signals of the air-fuel-ratio sensor 7 located upstream of the catalyst 5 and an air-fuel-ratio sensor 8 located downstream of the same 5. More specifically, in the state in which the catalyst 5 undergoes no deterioration, the output signal of the downstream air-fuel-ratio sensor 8 does not fluctuate similarly to that of the upstream air-fuel-ratio sensor 7. However, as the catalyst 5 deteriorates, the output signal of the downstream air-fuel-ratio sensor 8 comes to exhibit a fluctuation similar to that of the output signal of the upstream air-fuel-ratio sensor 7. These facts are utilized for the detection of the catalyst deterioration. Such a method of detecting the catalyst deterioration will be outlined below.

Figure 2:
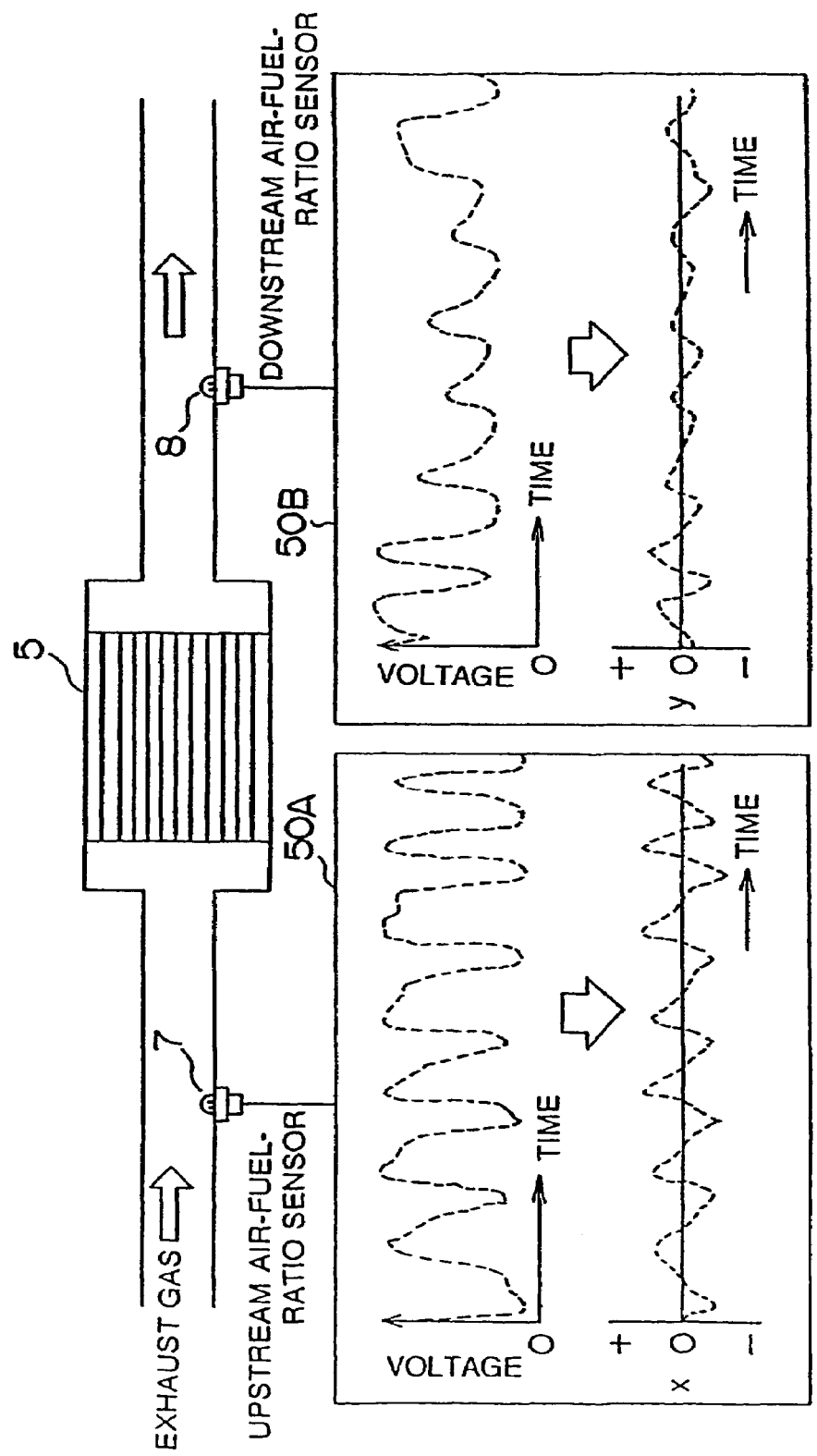
FIG. 2 is a diagram showing examples of the output signals of air-fuel-ratio sensors which are respectively mounted upstream and downstream of a catalyst.

The catalyst-deterioration-index calculation means 11 first measures the output signals of the air-fuel-ratio sensors 7 and 8 synchronously. Subsequently, D. C. (direct-current) components which disturb the deterioration detection are removed from the measured signals by the use of high-pass filters. FIG. 2 illustrates examples of these signals. In the figure, symbol x denotes the signal obtained by removing the D. C. component from the output signal of the upstream air-fuel-ratio sensor 7, while symbol y denotes the signal obtained by removing the D. C. component from the output signal of the downstream air-fuel-ratio sensor 8.

Besides, the catalyst-deterioration-index calculation means 11 calculates the auto-correlation function $\phi xx$ (Equation (3) given below) of the signal x and the cross-correlation function $\phi xy$ (Equation (4)) of the signals x and y:

$$\phi xx(\tau) = \int x(t)x(t-\tau)dt \quad (3)$$

t: time
τ: phase $$\phi xy(\tau) = \int x(t)y(t-\tau)dt \quad (4)$$

t: time
τ: phase

Since the auto-correlation function $\phi xx(\tau)$ assumes the maximum value $\phi xx(0)$ for $\tau=0$, the relationship of the following equation (5) holds:

$$(\phi xx)_{max} = \phi xx(0) \quad (5)$$

Further, the maximum value of the cross-correlation function $\phi xy(\tau)$ is found by varying the phase τ within the integral section of this function $\phi xy(\tau)$. Assuming that the maximum value is assumed for $\tau=\tau_o$, the following equation (6) is obtained:

$$(\phi xy)_{max} = \phi xy(\tau_o) \quad (6)$$

The catalyst deterioration index $\Phi c$ is calculated from these values in accordance with the following equation (7):

$$\Phi c = (\phi xy)_{max} / (\phi xx)_{max} \quad (7)$$

Figure 3:
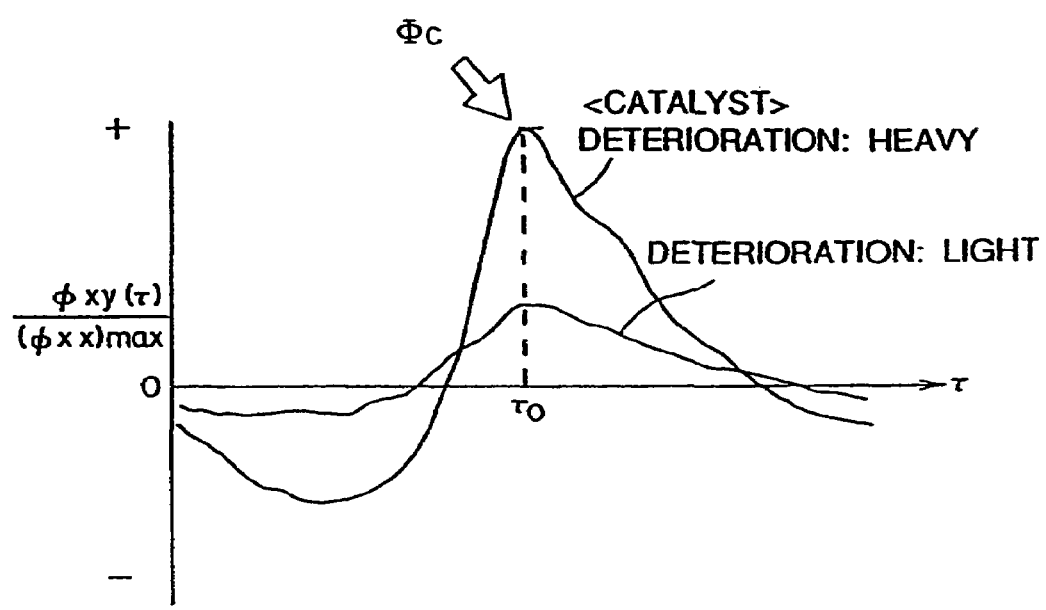
FIG. 3 is a graph for explaining the relationship between the degree of catalyst deterioration and the index of catalyst deterioration.

FIG. 3 illustrates the relationship between a formula $\phi xy(\tau)/(\phi xx)_{max}$ and the degree of catalyst deterioration. In a case where the degree of the deterioration of the catalyst 5 is high (the catalyst 5 has deteriorated heavily), the degree of the correlation between the output signal of the upstream air-fuel-ratio sensor 7 and that of the downstream air-fuel-ratio sensor 8 is high, and a high peak (maximum value) is demonstrated. On the other hand, in a case where the degree of the deterioration of the catalyst 5 is low (the catalyst 5 has deteriorated lightly), the degree of the correlation between both the output signals is low, and only a low peak (maximum value) is demonstrated. Accordingly, the degree of the deterioration of the catalyst 5 can be detected in accordance with the magnitude of the catalyst deterioration index $\Phi c$.

Incidentally, the method of detecting the deterioration degree stated here has already been proposed in Japanese Patent Laid-Open (KOKAI) No. 171924/1993.

The method of detecting the catalyst deterioration shall not be restricted to the aforementioned method. It is also allowed to employ, for example, a method wherein the catalyst deterioration is detected from the fluctuation widths, phase difference, frequencies or the like of the output signals of the air-fuel-ratio sensors 7 and 8. A large number of other examples have also been known, and any of these methods may well be employed. It is necessary, however, to alter a correction method etc. which will be explained below, in correspondence with the employed detection method.

The catalyst-deterioration decision means 12 checks the deterioration state of the catalyst 5 found by the catalyst-deterioration-index calculation means 11, thereby deciding whether or not the exhaust gas cleaning apparatus of the engine system is faulty. In this embodiment, the decision is rendered by comparing the catalyst deterioration index $\Phi c$ with a predetermined value set beforehand (the predetermined value corresponds to a "threshold value" in the appended claims). By way of example, when the catalyst deterioration index $\Phi c$ is greater than the predetermined value, the fault of the exhaust gas cleaning apparatus (namely, the failure of the catalyst 5) is decided. In the case of the fault, the driver of a vehicle on which the engine system is installed is warned by lighting up an alarm lamp not shown.

The misfire detection means 9 functions to detect the presence or absence of misfire every combustion stroke proceeding in the cylinder of the engine 1. A method of detecting the misfire is, for example, one disclosed in the official gazette of Japanese Patent Application Laid-open No. 206342/1991 wherein the misfire is detected from the fluctuation of the revolution speed (r. p. m.) of an engine. This method detects an r. p. m. fluctuation waveform or a combustion state during the combustion stroke of the engine. Another method of detecting the combustion state on the basis of the r. p. m. fluctuation is disclosed in U.S. Pat. No. 4,627,399. Still another method detects the combustion state from a combustion pressure, a temperature or/and the like in the combustion chamber of the engine, or from the pulsation of the pressure of exhaust gas or the temperature of the exhaust gas. Further, there have been known a method wherein the combustion state is detected from an ionic current which flows across an ion gap formed in the combustion chamber, as disclosed in U.S. Pat. No. 4,648,367, a method wherein it is detected by measuring combustion light in the combustion chamber, and a method wherein it is detected from the waveform of current flowing through an ignition coil, or the like. The misfire detection means 9 in this embodiment may employ any of such numerous known methods.

The secondary-air-system failure detection means 10 functions to detect the failure and deterioration of the secondary air system 6. This means 10 is realized by, for example, a method wherein a flow meter is disposed midway of the air passage of the secondary air system 6 so as to detect the actual flow rate of air and wherein the failure or deterioration is detected on the basis of the difference between the detected actual flow rate and a flow rate estimated from the controlled variable (voltage or current value) of the pump 60. Another method is based on the correction coefficient α explained before. More specifically, in the state in which the secondary air system 6 is operated, the air-fuel-ratio sensor 7 detects oxygen in a larger quantity. Therefore, when the air-fuel-ratio feedback control explained before is performed as it is, the correction coefficient α enlarges so as to increase the quantity of feed fuel. By exploiting this fact, the method decides the flow of no secondary air and detects the failure of the secondary air system 6 in such a case where the correction coefficient α does not enlarge in spite of the actuation of, e. g., the pump 60. The secondary-air-system failure detection means 10 may employ any of such numerous known methods.

The catalyst-deterioration-index correction means 13 corrects the catalyst-deterioration index Φc when the misfire of the engine 1 or the failure or deterioration of the secondary air system 6 has been detected by the misfire detection means 9 or by the secondary-air-system failure detection means 10. Then, the correction means 13 delivers the corrected catalyst deterioration index to the catalyst-deterioration decision means 12. Incidentally, the correction method will be described later together with the operation of this embodiment.

The catalyst-deterioration-decision interruption means 14 is endowed with a predetermined frequence or extent which concerns the misfire of the engine 1 or the failure and deterioration of the secondary air system 6 and which serves as a criterion for the interruption of the catalyst-deterioration decision. Thus, when the misfire or the failure or deterioration detected by the misfire detection means 9 or the secondary-air-system failure detection means 10 exceeds the predetermined frequence or extent, the interruption means 14 generates a signal for interrupting the decision of the deterioration of the catalyst 5 by the catalyst-deterioration decision means 12. By the way, the frequence or extent may well be altered depending upon temperature etc. as will be explained later.

There will be described the operation of this embodiment in the case where the engine 1 misfires.

Figure 4:
Figure 4:
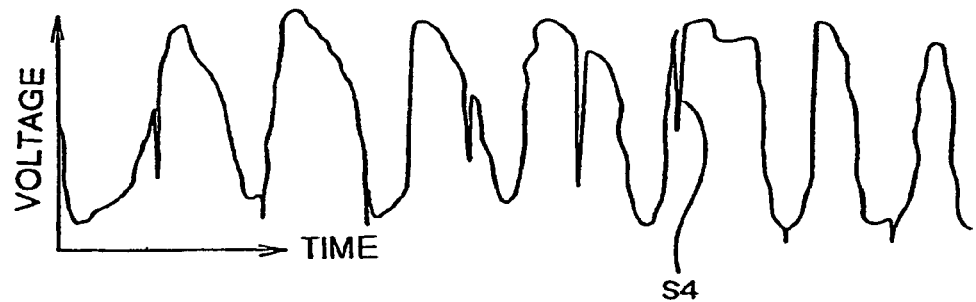

FIGS. 4A and 4B illustrate examples of the output signals of the air-fuel-ratio sensor 7 located upstream of the catalyst 5, in a non-misfiring condition and a misfiring condition, respectively.

When the misfire has occurred, the unburnt HC and the air flow into the exhaust pipe 100. Therefore, a spike signal S4 which indicates that the exhaust gas is lean (in other words, the exhaust gas contains the larger quantity of oxygen) appears in synchronism with the misfire. In such a misfiring condition, the reactions of oxidizing the unburnt HC proceed together with the ordinary cleaning reactions within the catalyst 5. Nevertheless, the HC and oxygen components which have not reacted flow downstream of the catalyst 5. In consequence, the downstream air-fuel-ratio sensor 8 is affected as stated below.

Figure 5:
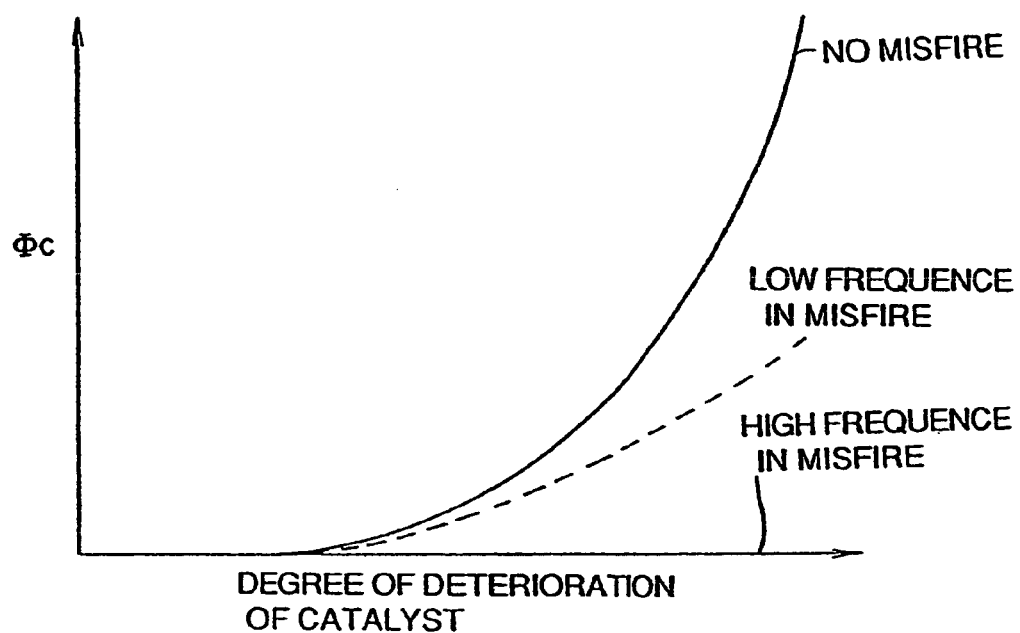
FIG. 5 is a graph showing influences which the misfire exerts on the catalyst deterioration index in a case where the downstream air-fuel-ratio sensor is an $O_2$-sensor.
Figure 6:
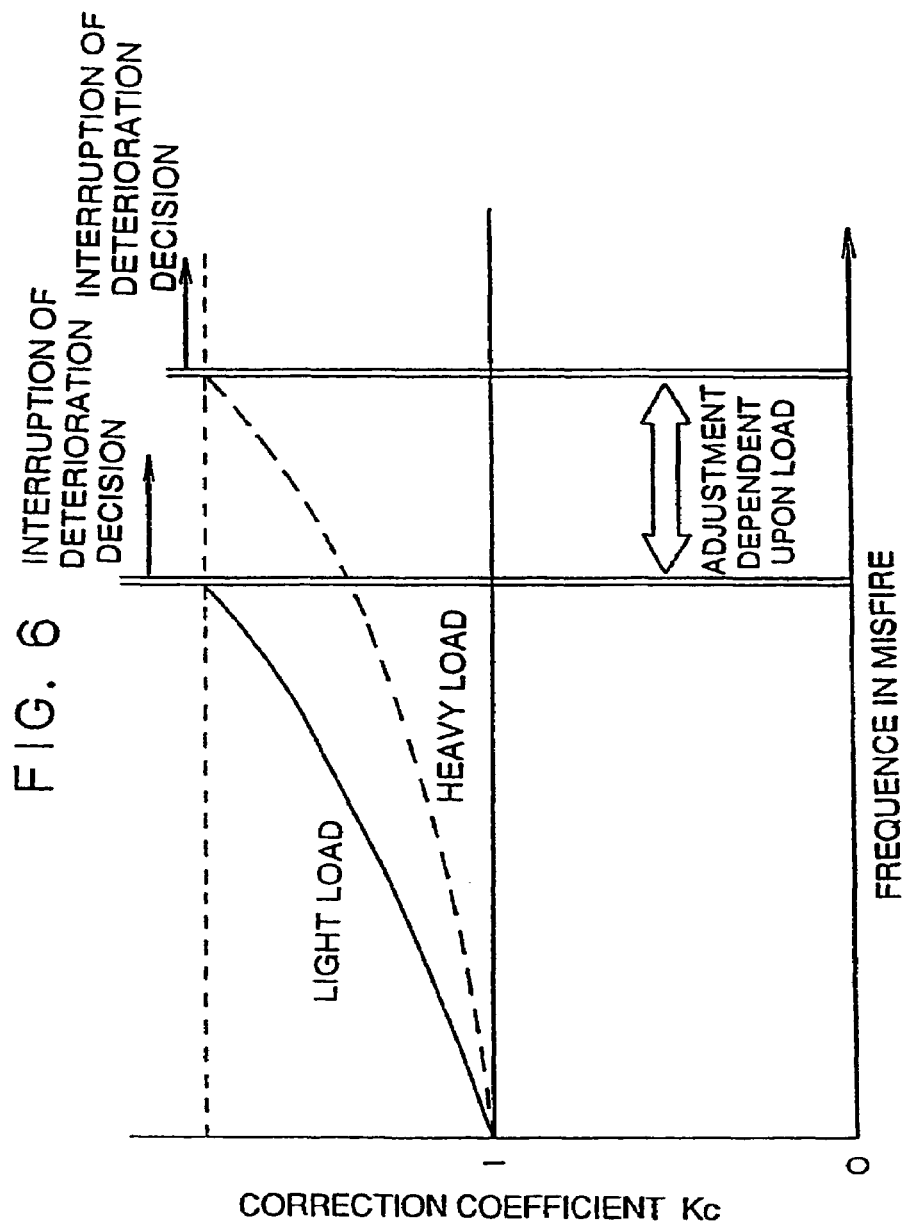
FIG. 6 is a graph showing a correction coefficient and decision interruption regions which correspond to the case of FIG. 5.

In the case where the air-fuel-ratio sensor 8 is the O$_2$-sensor which produces the binary output, the output signal shifts to the side thereof indicating the leaner exhaust gas and also has its amplitude decreased. As illustrated in FIG. 5, therefore, the catalyst deterioration index Φc changes in correspondence with the frequence in the misfire and becomes a smaller value. That is, the degree of the catalyst deterioration is estimated to be lower than the actual one. In the catalyst-deterioration-index correction means 13, accordingly, a correction which enlarges the catalyst deterioration index Φc in accordance with the frequence in the misfire may be performed by multiplying the index Φc by a correction coefficient Kc as illustrated in FIG. 6 by way of example. Alternatively, it is allowed to perform a correction in which the predetermined value to be compared with the catalyst deterioration index Φc in the catalyst-deterioration decision means 12 is made smaller in accordance with the frequence in the misfire contrariwise to the above. In such a case where one cylinder continues to misfire in the engine 1 of, e. g., six cylinders, oxygen and HC which ought to react in proper quantities by the combustion do not entirely react within the exhaust pipe 100 as well as the catalyst 5, and hence, the larger quantity of oxygen flows even to the lower stream part of the exhaust pipe 100 with respect to the catalyst 5. In consequence, the downstream air-fuel-ratio sensor 8 delivers the output signal which indicates that the air fuel ratio is greater than the stoichiometric ratio (in other words, the exhaust gas is leaner than one of the stoichiometric ratio), irrespective of the degree of the deterioration of the catalyst 5. Moreover, the signal becomes a fixed value (the signal of substantially null amplitude). As a result, the catalyst deterioration index Φc assumes a fixed value irrespective of the degree of the catalyst deterioration and cannot be corrected. Accordingly, in a case where the occurring frequence in the misfire is lower than a predetermined value, the catalyst deterioration index Φc should preferably be corrected in accordance with the pertinent frequence. On the other hand, in a case where the frequence is higher than the predetermined value, the decision of the catalyst deterioration should preferably be interrupted while the misfire is occurring or the frequence is in excess of the predetermined value.

The magnitude of the correction and the misfire frequence permitting the correction, change depending upon the temperature of the catalyst 5, the load of the engine 1, etc. This is based on such a reason that the velocities of the oxidizing reactions of the HC differ depending upon the temperature of the catalyst 5 (the reaction velocities are higher as the temperature is higher within a temperature range which the catalyst 5 can usually assume). It is therefore favorable that the correction coefficient Kc and the misfire frequence for interrupting the catalyst deterioration decision are altered as exemplified in FIG. 6, depending upon the temperature of the catalyst 5 and the operating conditions of the engine 1. Many of the actual misfiring states of the engine 1 are such that one or more cylinders fail to ignite substantially continuously on account of, e. g., the trouble of an ignition system. In this case, the misfire at the frequence not permitting the correction of the catalyst deterioration index Φc is detected at one stroke. Accordingly, it is often satisfactory that, when the misfire has occurred at the frequence affecting the detection of the catalyst deterioration, the decision of the catalyst deterioration is interrupted immediately without performing the index correction. In this case, in many of the known examples, the misfire detection means 9 gives warning to the driver against the occurrence of the misfire. In practical use, therefore, it hardly poses any problem that the decision of the catalyst deterioration is restarted after the ignition system, for example, has been repaired on the basis of the warning.

Figure 7:
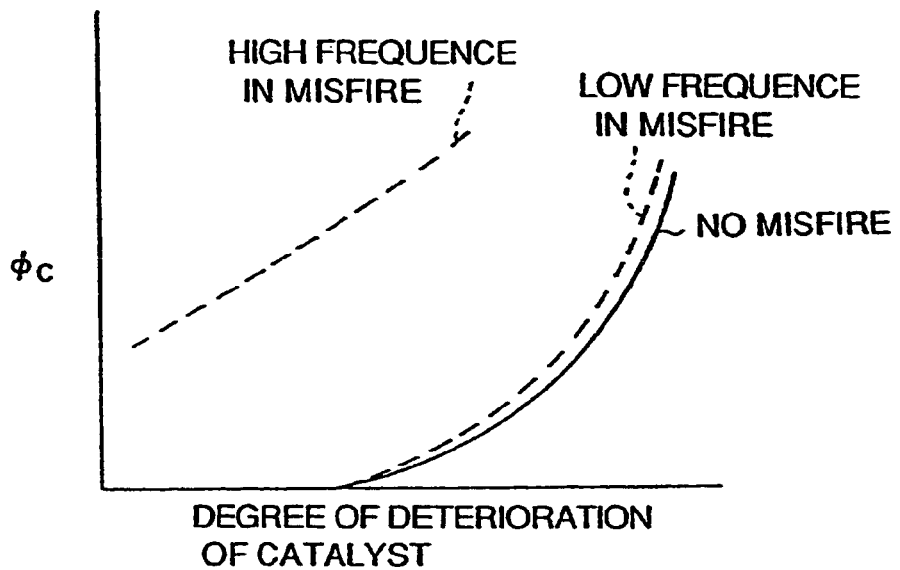
FIG. 7 is a graph showing influences which the misfire exerts on the catalyst deterioration index in a case where the downstream air-fuel-ratio sensor is a so-called "UEGO sensor(universal exhaust gas oxygen sensor)"
Figure 8:
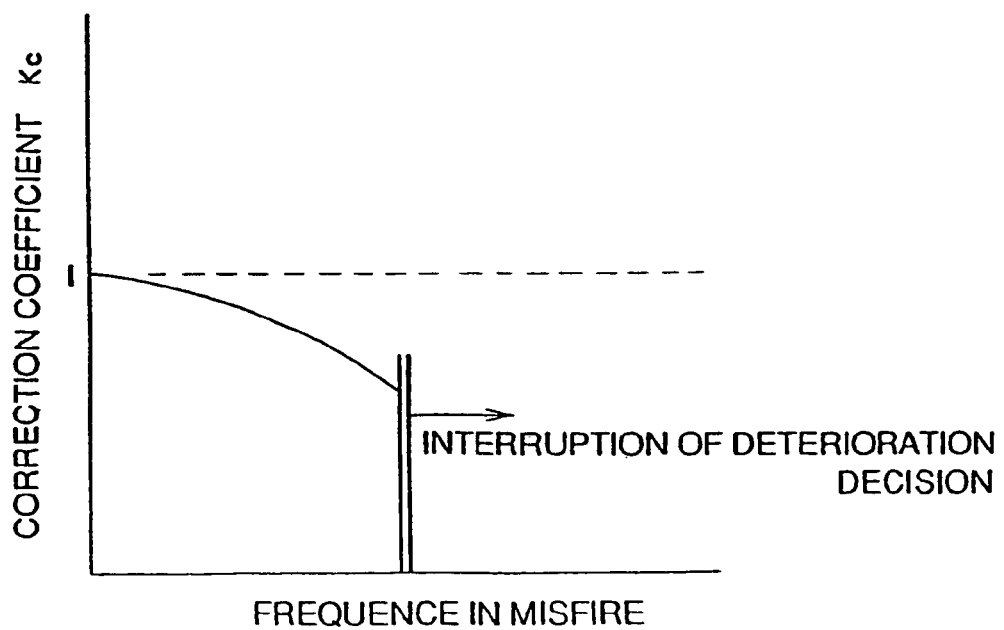
FIG. 8 is a graph showing a correction coefficient and a decision interruption region which correspond to the case of FIG. 7.

Meanwhile, in the case where the downstream air-fuel-ratio sensor 8 is the so-called "UEGO sensor", it delivers the output signal indicating the lean exhaust gas in substantial synchronism with the spike output signal of the upstream air-fuel-ratio sensor 7 in the misfiring condition (refer to FIG. 4B). As illustrated in FIG. 7, therefore, when the frequence in the misfire is low, the catalyst deterioration index Φc becomes a value which is greater though slightly. When the frequence in the misfire is somewhat high, the catalyst 5 does not react normally in spite of no deterioration thereof, so that the air-fuel-ratio sensors 7 and 8 deliver signal waveforms being closely similar to each other, and the catalyst deterioration index Φc demonstrates a great value. It is accordingly recommended that, as illustrated in FIG. 8 by way of example, the correction of multiplying the catalyst deterioration index Φc by the coefficient Kc which makes this index Φc smaller is performed when the misfire frequence is low, while the decision of the catalyst deterioration is inhibited when the misfire frequence is high.

As in the foregoing case of the O$_2$-sensor, it is often satisfactory that, when the misfire has occurred at the frequence affecting the detection of the catalyst deterioration, the decision of the catalyst deterioration is interrupted immediately without performing the index correction. Further, on this occasion, the catalyst deterioration index Φc becomes a greater value in the decision of the catalyst deterioration, and hence, the catalyst 5 undergoing no deterioration might have been erroneously decided as undergoing the deterioration. It is therefore favorable to discard the last result of the decision of the catalyst deterioration.

The diagnostic equipment may well be so constructed that, unlike to the above, only the correction by the catalyst-deterioration-index (Φc) correction means 13 is done without disposing the catalyst-deterioration-decision interruption means 14.

Next, the operation of this embodiment will be described concerning the case where the secondary air system 6 has failed or deteriorated.

As stated before, the secondary air system 6 serves to introduce the secondary air into the exhaust pipe 100 by means of the pump 60 and to burn and decrease the surplus HC emitted into the exhaust pipe 100, generally in the operating condition in which the mixture must be made "rich" or set at a smaller air fuel ratio (for example, at the start of the engine 1). Usually, the secondary air system 6 is not in operation during the air-fuel-ratio feedback control. In the catalyst deterioration detecting method of this embodiment, accordingly, a special problem is such a failure that the secondary air flows out of the secondary air system 6 during the sampling of the data by the air-fuel-ratio sensors 7 and 8.

Influences in the case of the occurrence of such a failure differ depending upon the positional relationship between the air-fuel-ratio sensor 7 and the inlet 62 of the secondary air system 6 to the exhaust pipe 100, and so forth.

In the case where the air-fuel-ratio sensor 7 is located on the lower stream side of the exhaust pipe 100 with respect to the inlet 62 (as illustrated in FIG. 1), it detects oxygen which has flowed in from the secondary air system 6, thereby deciding that the exhaust gas is "lean". Consequently, the air-fuel-ratio feedback control means 3 performs the feedback control so as to increase the feed fuel (namely, to bring the mixture to the "rich" side thereof). As a result, the quantity of the fuel enlarges in excess of an amount which corresponds to the oxygen having flowed in from the secondary air system 6. Eventually, the exhaust gas becomes "rich" at the position of the catalyst 5. Therefore, the output signal of the air-fuel-ratio sensor 8 mounted downstream of the catalyst 5 shifts to the "rich" side thereof.

Figure 9:
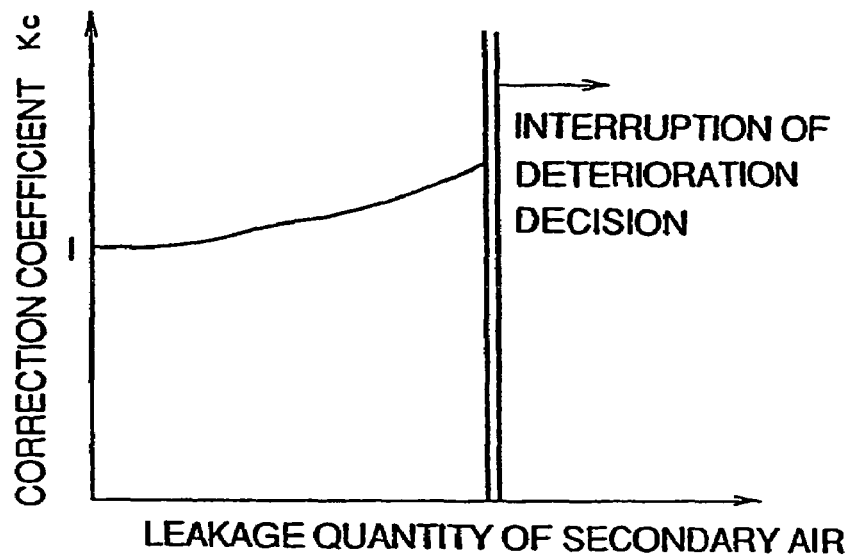
FIG. 9 is a graph showing a correction coefficient and a decision interruption region in the case where the leakage quantity of secondary air is considered in correspondence with the $O_2$-sensor in FIG. 5.

In this regard, in the case where the downstream air-fuel-ratio sensor 8 is the $O_2$-sensor of the type which detects the air fuel ratio in terms of the binary value, the detected air fuel ratio deviates from the air fuel ratio of the output variation thereof, and the amplitude of the output waveform thereof decreases. As in the case of FIG. 5, therefore, the catalyst deterioration index Φc assumes a smaller value in accordance with the leakage quantity of the secondary air. When the leakage quantity of the secondary air enlarges more, the output signal of the air-fuel-ratio sensor 8 falls into a fixed state ("rich" state). Therefore, the catalyst deterioration index Φc becomes substantially null and can no longer be corrected. It is accordingly recommended that, as illustrated in FIG. 9, the catalyst deterioration index Φc is multiplied by the coefficient Kc for its correction when the leakage quantity of the secondary air is small, while the detection of the catalyst deterioration is interrupted when the leakage quantity is large.

In general, the secondary-air-system failure detection means 10 becomes costly for the precise detection of the leakage quantity, so that the accuracy thereof is not very high. Therefore, it is sometimes the case that the decision of the catalyst deterioration is already impossible when the failure of the secondary air system 6 has been decided. Accordingly, the decision of the deterioration may well be interrupted at one stroke without performing the index correction.

Alternatively, the diagnostic equipment may well be so constructed that, unlike to the above, only the correction by the catalyst-deterioration-index (Φc) correction means 13 is done without disposing the catalyst-deterioration-decision interruption means 14.

Figure 10:
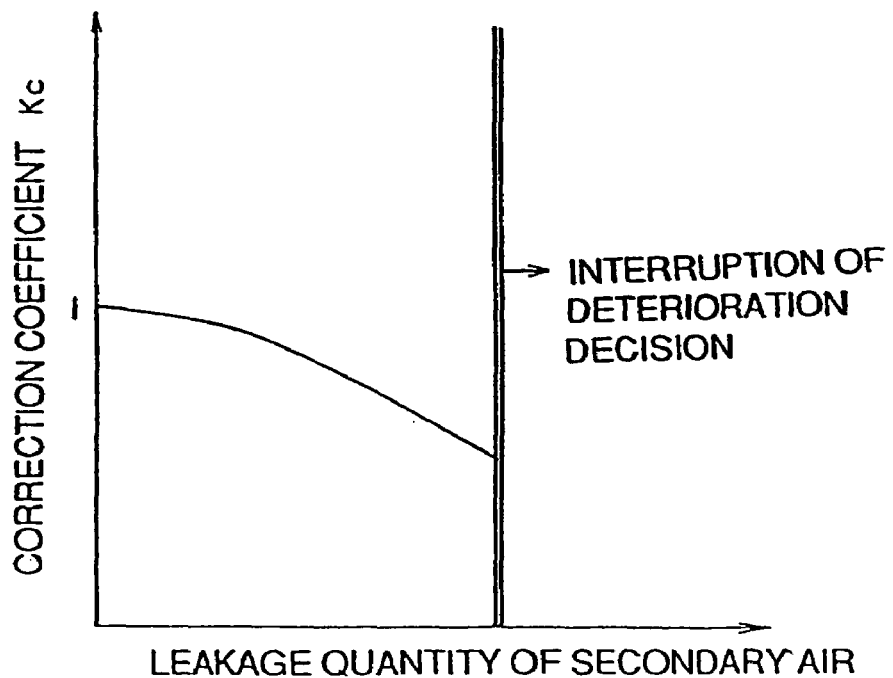
FIG. 10 is a graph showing a correction coefficient and a decision interruption region in the case where the leakage quantity of secondary air is considered in correspondence with the wide-region sensor in FIG. 7.

On the other hand, in the case where the downstream air-fuel-ratio sensor 8 is the UEGO sensor, the leakage of the secondary air incurs the fluctuation of the air fuel ratio exceeding the range thereof in which the catalyst 5 can efficiently carry out the oxidizing and deoxidizing reactions, and it enlarges the amplitude of the output signal of the air-fuel-ratio sensor 8. As a result, the catalyst deterioration index Φc assumes a greater value in accordance with the leakage quantity of the secondary air. When the leakage quantity of the secondary air enlarges more, the output signal of the air-fuel-ratio sensor 8 exceeds the full-scale value thereof irrespective of the degree of the deterioration of the catalyst 5, and the catalyst deterioration index Φc can no longer be corrected. It is accordingly recommended that, as illustrated in FIG. 10, the catalyst deterioration index Φc is multiplied by the coefficient Kc for its correction when the leakage quantity from the secondary air system 6 is small, while the detection of the catalyst deterioration is interrupted when the leakage quantity is large. As in the foregoing case, it is also allowed herein that, when the failure of the secondary air system 6 has been decided, the decision of the catalyst deterioration is interrupted at one stroke without performing the index correction. Further, on this occasion, the catalyst deterioration index Φc becomes the greater value in the decision of the catalyst deterioration, and hence, the catalyst 5 undergoing no deterioration might have been erroneously decided as undergoing the deterioration. It is therefore favorable to discard the last result of the decision of the catalyst deterioration. The diagnostic equipment may well be so constructed that, unlike to the above, only the correction by the catalyst-deterioration-index (Φc) correction means 13 is done without disposing the catalyst-deterioration-decision interruption means 14.

As thus far described, in the case where the leakage quantity of the secondary air is small, the catalyst deterioration index Φc is corrected by the catalyst-deterioration-index correction means 13. On this occasion, the directions of the corrections are the opposite in correspondence with the sorts of the air-fuel-ratio sensor 8. On the other hand, in the case where the leakage quantity of the secondary air is large, the decision of the catalyst deterioration should preferably be interrupted by the catalyst-deterioration-decision interruption means 14.

The leakage quantity of the secondary air permitting the correction changes depending upon the temperature of the catalyst 5, etc. It is therefore favorable that the magnitude of the correction and the leakage air quantity for interrupting the catalyst deterioration decision are altered depending upon the temperature of the catalyst 5 or/and the operating conditions of the engine 1. In general, likewise to the correction ascribable to the misfire, the correction magnitude is made smaller as the load of the engine 1 is heavier. In addition, the leakage air quantity for interrupting the decision is altered to the side thereof on which the leakage quantity is larger.

Now, a diagnostic equipment for deciding the deterioration of an air-fuel-ratio sensor will be described as the second embodiment of the present invention.

Figure 11:
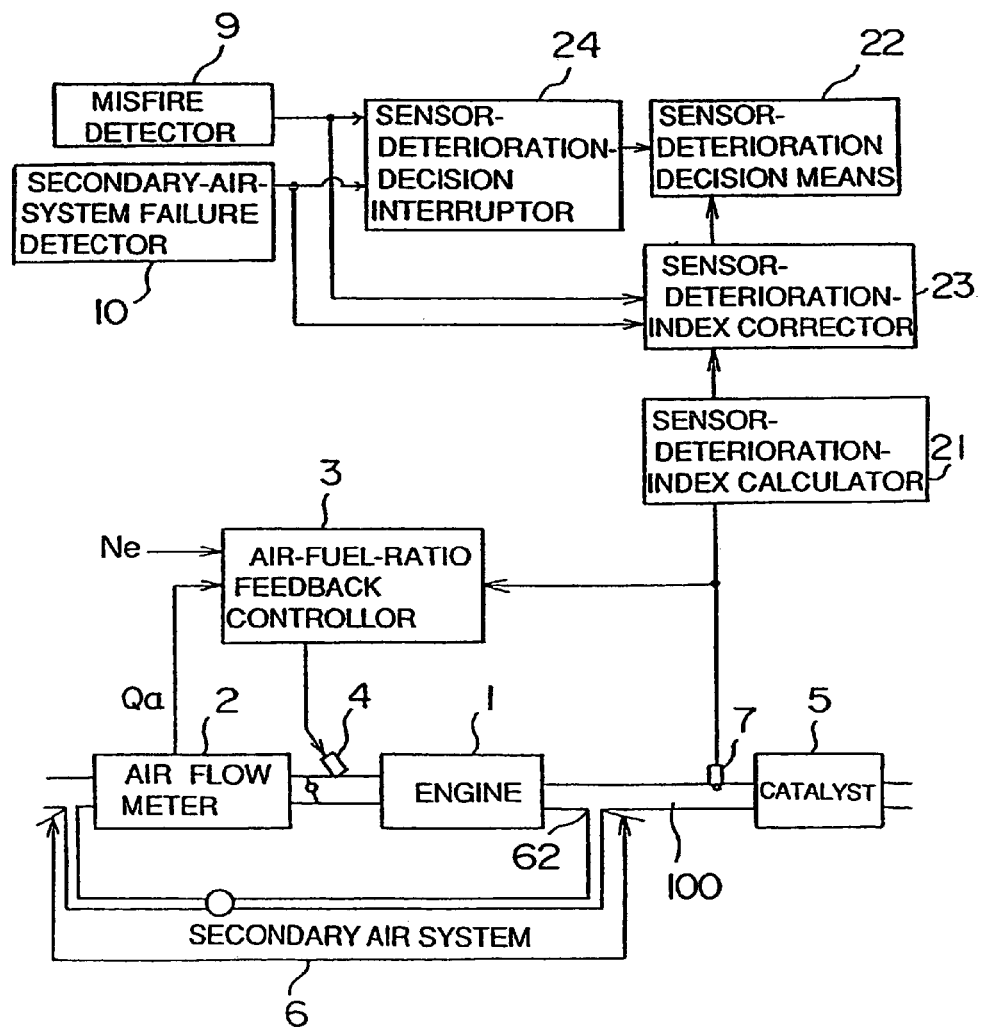
FIG. 11 is a block diagram showing the construction of another embodiment of the present invention.

FIG. 11 generally illustrates the construction of the diagnostic equipment in this embodiment, together with that of an engine system to which the diagnostic equipment is applied. An engine 1, an air flow meter 2, air-fuel-ratio feedback control means 3, an injector 4, an air-fuel-ratio sensor 7, etc. are the same as those described in the first embodiment, respectively.

The diagnostic equipment is constructed comprising misfire detection means 9, secondary-air-system failure detection means 10, sensor-deterioration-index calculation means 21, sensor-deterioration decision means 22, sensor-deterioration-index correction means 23 and sensor-deterioration-decision interruption means 24.

The sensor-deterioration-index calculation means 21 serves to detect the deterioration state of the air-fuel-ratio sensor 7. In this embodiment, the detection of the deterioration state is effected using the auto-correlation function of the output signal of the air-fuel-ratio sensor 7. More specifically, the sensor deterioration-index calculation means 21 calculates the auto-correlation function $\phi xx(0)$ on the basis of the signal x (refer to FIG. 2) obtained by removing the D.C. component from the output signal of the air-fuel-ratio sensor 7, in the same manner as in the foregoing case of the catalyst-deterioration-index calculation means 11. In case of adopting the function $\phi xx(0)$ as a deterioration index $\Phi sr$ which expresses the degree of deterioration of the responsivity of the air-fuel-ratio sensor 7, the deterioration index $\Phi sr$ assumes a greater value when the air-fuel-ratio sensor 7 undergoes no deterioration, and it assumes a smaller value when the air-fuel-ratio sensor 7 undergoes the deterioration.

The method of detecting the deterioration of the air-fuel-ratio sensor 7 is not restricted to the above one. There have been known the other examples of detection methods each of which is based on the differential value of the output signal of the air-fuel-ratio sensor 7, a response time period required for the output signal to change to the amount of a predetermined voltage, or the frequency of the output signal. Any of these methods may well be employed. Merely, a correction method etc. which will be explained below come to differ in correspondence with the employed detection method.

The sensor-deterioration decision means 22 compares the sensor deterioration index $\Phi sr$ with a predetermined value (the predetermined value corresponds to a "threshold value" in the appended claims), thereby deciding the degree of the deterioration of the air-fuel-ratio sensor 7. When the sensor deterioration index $\Phi sr$ is greater than the predetermined value, the failure of the sensor 7 is decided. In the case of the failure, the driver of a vehicle on which the engine system is installed is warned by, for example, lighting up an alarm lamp not shown.

The misfire detection means 9 and the secondary-air-system failure detection means 10 are similar to those in the first embodiment, respectively.

The sensor-deterioration-index correction means 23 corrects the sensor deterioration index $\Phi sr$ when the misfire of the engine 1 or the failure or deterioration of a secondary air system 6 has been detected by the misfire detection means 9 or by the secondary-air-system failure detection means 10. Then, the correction means 23 delivers the corrected sensor deterioration index to the sensor-deterioration decision means 22.

The sensor-deterioration-decision interruption means 24 is endowed with a predetermined frequence or extent which concerns the misfire of the engine 1 or the failure of the secondary air system 6 and which serves as a criterion for the interruption of the sensor-deterioration decision. Thus, when the misfire or the failure or deterioration detected by the misfire detection means 9 or the secondary-air-system failure detection means 10 exceeds the predetermined frequence or extent, the interruption means 24 generates a signal for interrupting the decision of the deterioration of the air-fuel-ratio sensor 7 by the sensor-deterioration decision means 22.

There will be described the operation of this embodiment in the case where the engine 1 misfires.

Figure 12:
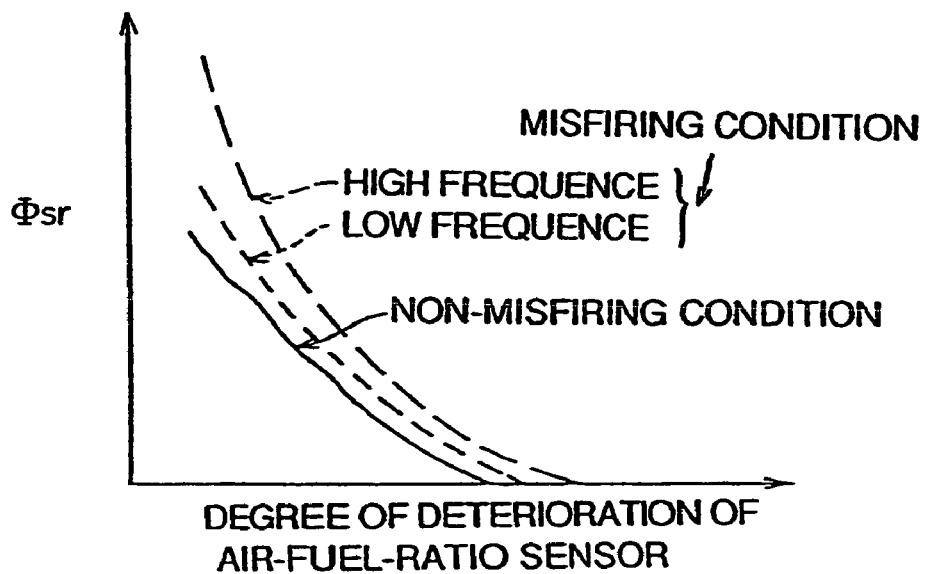
FIG. 12 is a graph showing influences which misfire exerts on an index for the deterioration of an air-fuel-ratio sensor which is mounted upstream of a catalyst in the embodiment depicted in FIG. 11.
Figure 13:
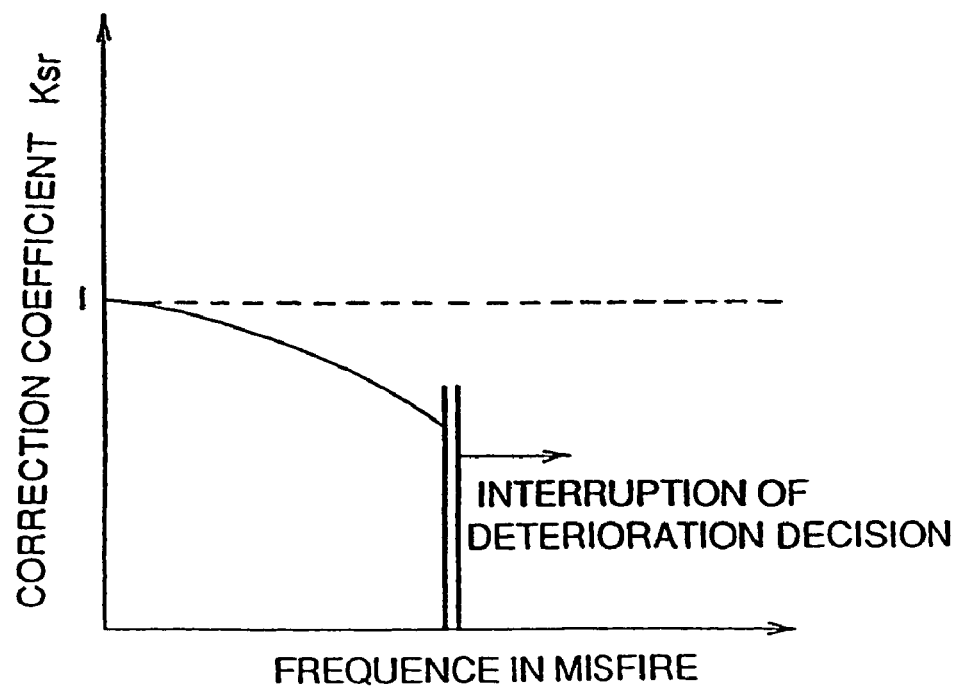
FIG. 13 is a graph showing a correction coefficient and a decision interruption region which correspond to the case of FIG. 12.

When the misfire occurs, a spike "lean" signal (S4 in FIG. 4B) appears. Then, the sensor deterioration index $\Phi sr$ assumes a greater value, depending upon the frequence in the occurrence of the misfire (refer to FIG. 12). That is, the responsivity of the air-fuel-ratio sensor 7 is estimated to be better than the actual one, and the degree of the sensor deterioration is decided to be lower. This holds true without regard to the sorts of the air-fuel-ratio sensor 7. In the sensor-deterioration-index correction means 23, accordingly, a correction which makes the sensor deterioration index $\Phi sr$ smaller is performed by multiplying the index $\Phi sr$ by a correction coefficient Ksr which is determined in accordance with the frequence in the misfire (refer to FIG. 13). When the frequence in the misfire is too high, the sensor deterioration index $\Phi sr$ disperses greatly. Therefore, the decision of the deterioration of the air-fuel-ratio sensor 7 is interrupted by the sensor-deterioration-decision interruption means 24.

Next, the operation of this embodiment will be described concerning the case where the secondary air system 6 has failed.

As in the case of detecting the deterioration of a catalyst 5, a special problem is such a failure that the secondary air leaks through the secondary air system 6 during the sampling of the data by the air-fuel-ratio sensor 7. Influences in the case of the occurrence of such a failure differ depending upon, e. g., the mixed state of exhaust gas emitted from the engine 1 and the leakage air flowing in from the secondary air system 6, in that part of an exhaust pipe 100 which extends between the air-fuel-ratio sensor 7 and the inlet 62 of the system 6 to the exhaust pipe 100.

Figure 14:
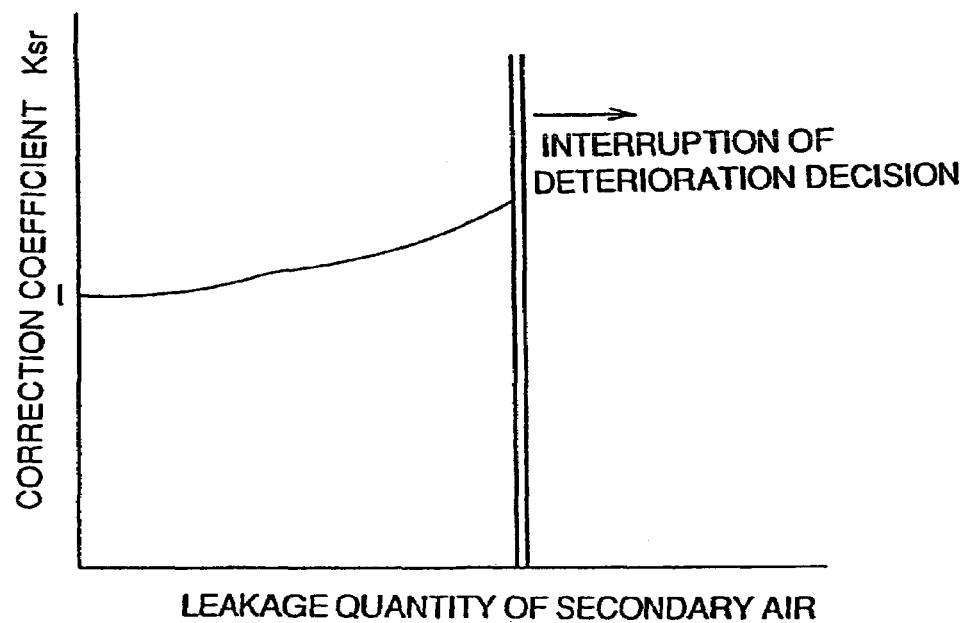
FIG. 14 is a graph showing a correction coefficient and a decision interruption region in the case where the leakage quantity of secondary air is taken into consideration.

In this regard, in the case where the air-fuel-ratio sensor 7 is the $O_2$-sensor of the type which detects the air fuel ratio in terms of the binary value, a signal on the "rich" side thereof becomes difficult of appearing on account of the secondary air (oxygen) leaking in from the inlet 62. Therefore, the amplitude of the output waveform of the air-fuel-ratio sensor 7 decreases, and the sensor deterioration index $\Phi sr$ assumes a smaller value, in accordance with the leakage quantity of the secondary air. When the leakage quantity of the secondary air enlarges more, the sensor deterioration index $\Phi sr$ becomes substantially null and can no longer be corrected. As illustrated in FIG. 14, accordingly, the sensor deterioration index $\Phi sr$ is multiplied by the coefficient Ksr for its correction when the leakage quantity of the secondary air is small, while the detection of the sensor deterioration is interrupted when the leakage quantity is large.

On the other hand, in the case where the air-fuel-ratio sensor 7 is the UEGO sensor, the sensor deterioration index $\Phi sr$ assumes a smaller value subject to the leakage quantity which is small. When the leakage quantity enlarges more, the output of the air-fuel-ratio sensor 7 becomes unstable, and the decision of the sensor deterioration can no longer be rendered. Accordingly, the same correction and deterioration-decision interruption as in FIG. 14 are done.

As stated before, in general, the accuracy of the secondary-air-system failure detection means 10 is not very high. Therefore, it is sometimes the case that the decision of the deterioration of the air-fuel-ratio sensor 7 is already impossible when the failure of the secondary air system 6 has been decided. Accordingly, the decision of the deterioration may well be interrupted at one stroke in the case where the failure of the secondary air system 6 has been decided.

Alternatively, the diagnostic equipment may well be so constructed that, unlike to the above, only the correction by the sensor-deterioration-index correction means 23 is done without disposing the sensor-deterioration-decision interruption means 24.

Although the decision of the deterioration of the air-fuel-ratio sensor 7 concerning the responsivity thereof has been explained above, the deterioration of the air-fuel-ratio sensor 7 concerning the output voltage thereof may well be decided as another example. In this example, the deterioration is detected by measuring the output of the air-fuel-ratio sensor 7 with the air fuel ratio of the exhaust gas held at a predetermined value. Herein, the air fuel ratio fluctuates due to the misfire of the engine 1 or the failure of the secondary air system 6, so that the correction of the deterioration index and the interruption of the deterioration decision are required.

By way of example, in case of deciding the output voltage of the "rich" side signal of the air-fuel-ratio sensor 7 under the condition that the air fuel ratio is held at the predetermined value in the "rich" state of the exhaust gas, the air-fuel-ratio sensor 7 generates a "lean" signal when the secondary air is leaking through the secondary air system 6. As a result, the deterioration of the air-fuel-ratio sensor 7 is erroneously decided. Besides, a similar situation takes place when the engine 1 misfires. In case of a low frequence in the misfire, the air-fuel-ratio sensor 7 delivers a "lean" spike signal (S4 in FIG. 4B). On the other hand, in case of a high frequence in the misfire, the output signal of the binary air-fuel-ratio sensor 7 demonstrates a fixed value ("lean" state), or the output signal of the UEGO sensor 7 disperses greatly. Accordingly, the present invention is also applicable to such a deterioration decision.

In addition, although the detection of the deterioration of the air-fuel-ratio sensor 7 mounted upstream of the catalyst 5 has been referred to in this embodiment, the correction of the deterioration index and the interruption of the deterioration decision need to be done in correspondence with the misfire of the engine 1 and the failure of the secondary air system 6, also in the detections of the deteriorations of an air-fuel-ratio sensor mounted downstream of the catalyst 5. The present invention is also applicable to the deterioration detections.

As thus far explained, the correction of the sensor deterioration index Ksr and the interruption of the sensor deterioration decision need to be done in correspondence with the misfire of the engine 1 and the failure of the secondary air system 6, also in the detection of the deterioration of the air-fuel-ratio sensor, so that the present invention is also applicable to the deterioration detection.

Further, although the case of correcting the catalyst or sensor deterioration index has been described in the above, it is substantially the same to correct the threshold value with which the catalyst or sensor deterioration index is compared in order to decide the deterioration.

What is claimed is:

1. A diagnostic equipment for an exhaust gas cleaning apparatus;

said exhaust gas cleaning apparatus being directed toward an engine system furnished with an air-fuel-ratio controller which detects an air fuel ratio of exhaust gas emitted from an engine and which adjusts a quantity of fuel injection so as to hold the air fuel ratio of the exhaust gas at a predetermined value, and cleaning said exhaust gas by means of a catalyst;

said diagnostic equipment, comprising:

a first air-fuel-ratio sensor which detects the air fuel ratio of the exhaust gas downstream of said catalyst;

a second air-fuel-ratio sensor which detects the air fuel ratio of the exhaust gas downstream of said catalyst;

catalyst-deterioration-index calculation means for calculating a catalyst deterioration index indicative of a deterioration state of said catalyst from output signals of said first air-fuel-ratio sensor and said second air-fuel-ratio sensor;

catalyst-deterioration decision means endowed with a predetermined threshold value, for deciding the deterioration state of said catalyst through a comparison between the threshold value and the catalyst deterioration index;

abnormality detection means for detecting any abnormality of said engine system as affects said catalyst deterioration index;

catalyst-deterioration-decision interruption means for interrupting the decision of said catalyst-deterioration decision means when a frequency of detected by said abnormality detection means exceeds a predetermined frequency; and frequency changing means for changing said predetermined frequency according to an engine system state.

2. A diagnostic equipment for an exhaust gas cleaning apparatus as defined in claim 1, wherein said abnormality detection means comprises misfire detection means for detecting a combustion state of said engine so as to detect occurrence of misfire of said engine.

3. A diagnostic equipment for an exhaust gas cleaning apparatus as defined in claim 1, wherein:

said engine system includes a secondary air system which introduces air into a part of an exhaust pipe located between said engine and said catalyst; and said abnormality detection means comprises secondary-air-system failure detection means for detecting a failure of said secondary air system.

4. A diagnostic equipment for an exhaust gas cleaning apparatus;

said exhaust gas cleaning apparatus being directed toward an engine system furnished with an air-fuel-ratio controller which detects an air fuel ratio of exhaust gas emitted from an engine and which adjusts a quantity of fuel injection so as to hold the air fuel ratio of the exhaust gas at a predetermined value, and cleaning said exhaust gas by means of a catalyst;

said diagnostic equipment, comprising:

an air-fuel-ratio sensor which detects the air fuel ratio of the exhaust gas;

sensor-deterioration-index calculation means for calculating an air-fuel-ratio-sensor-deterioration index indicative of a deterioration state of said air-fuel-ratio sensor from an output signal of said air-fuel-ratio sensor;

sensor-deterioration decision means endowed with a predetermined threshold value, for deciding the deterioration state of said air-fuel-ratio sensor through a comparison between the threshold value and the air-fuel-ratio-sensor-deterioration index;

abnormality detection means for detecting any abnormality of said engine system as affects said air-fuel-ratio-sensor-deterioration index;

sensor-deterioration-decision interruption means for interrupting the decision of said sensor-deterioration decision means when a frequency abnormality detected by said abnormality detection means exceeds a predetermined frequency; and frequency changing means for changing said predetermined frequency according to an engine system state.

5. A diagnostic equipment for an exhaust gas cleaning apparatus as defined in claim 4, wherein said abnormality detection means comprises misfire detection means for detecting a combustion state of said engine so as to detect occurrence of misfire of said engine.

6. A diagnostic equipment for an exhaust gas cleaning apparatus as defined in claim 4, wherein:

said engine system includes a secondary air system which introduces air into a part of an exhaust pipe located between said engine and said catalyst; and said abnormality detection means comprises secondary-air-system failure detection means for detecting a failure of said secondary air system.

* * * * *